Dec. 29, 1964    W. G. NEGWER    3,162,881
ADJUSTABLE BULL FLOAT
Filed Aug. 19, 1963
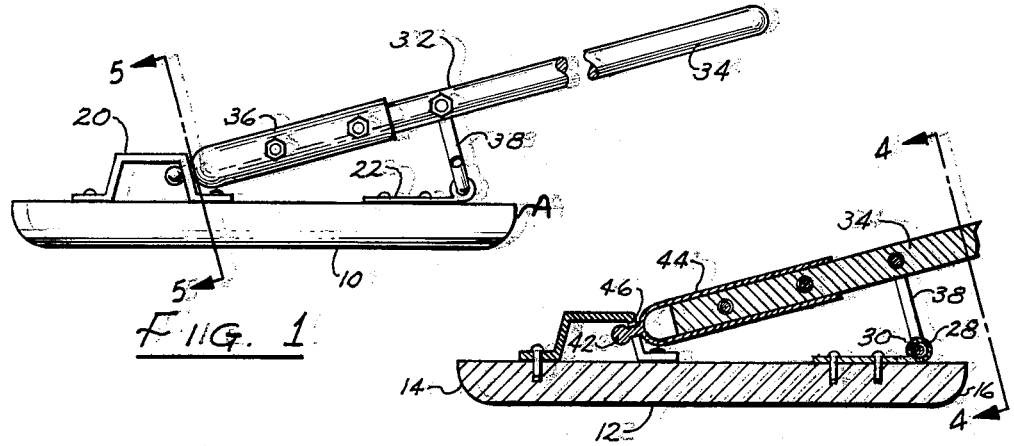
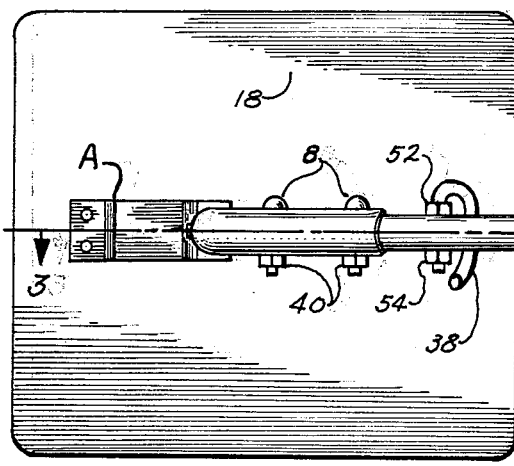
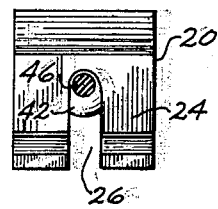
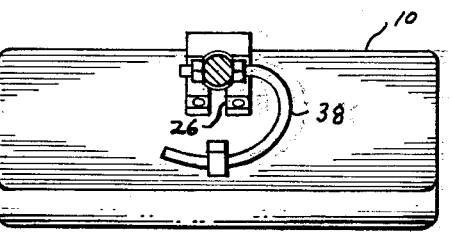
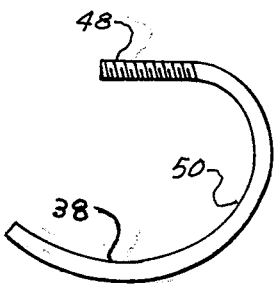
INVENTOR.
WALTER G. NEGWER
BY
Joseph A. Fenlon, Jr.
ATTORNEY United States Patent Office 3,162,881
Patented Dec. 29, 1964

3,162,881
ADJUSTABLE BULL FLOAT
Walter G. Negwer, 49 Airport Road, Ferguson, Mo.
Filed Aug. 19, 1963, Ser. No. 302,914
5 Claims. (Cl. 15—235.8)

This invention relates to bull floats for use in finishing large areas of freshly poured concrete.

It is the object of this invention to provide a bull float having a handle which is readily and selectively adjustable in pitch.

With the above and other objects in view, which will become immediately apparent upon reading the specification, my invention resides in the novel features of form, construction, arrangements, and combinations of parts presented in the following description and stated in the claims.

In the drawings:

FIGURE 1 is a side elevational view of a tool embodying my invention, the handle of said tool being abbreviated in length for purposes of convenience.

FIGURE 2 is a fragmentary top plan view thereof.

FIGURE 3 is a fragmentary sectional view taken along lines 3—3 of FIGURE 2.

FIGURE 4 is a fragmentary sectional view taken along lines 4—4 of FIGURE 3.

FIGURE 5 is a fragmentary sectional view taken along lines 5—5 of FIGURE 1.

FIGURE 6 is an enlarged view of the arcuate control member.

Referring now in more detail and by reference character to the drawings, which illustrate a preferred embodiment of my invention, A designates a bull float comprising a float member 10, conventionally of the type used for finishing large areas of freshly poured concrete, and including a smooth base 12, a curved leading edge 14, a curved trailing edge 16, and a substantially flat upper surface 18. Bolted or otherwise rigidly secured to the upper surface 18 and projecting upwardly therefrom are brackets 20 and 22, the bracket 20 being adjacent the leading edge 14 and the bracket 22 being adjacent the trailing edge 16.

The rearwardly presented surface 24 of the bracket 20 is canted downwardly and rearwardly and is provided, intermediate its lateral edges with a downwardly extending slot 26, which said slot 26 extends completely to the rearwardmost edge of the bracket 20, all for purposes presently more fully to appear. The bracket 22 is aligned in a general front to rear relation with the bracket 20 and is provided adjacent its rearwardmost end with an upwardly extending loop 28 which defines a cylindrically shaped passageway 30.

Pivotally attached to the bracket 20 and extending rearwardly therefrom is a handle 32 comprising an elongated cylindrical staff 34, a shell 36 and a control member 38. The shell 36 is contoured to define a surface of revolution and is hollowed for purposes of overlapping engagement with one end of the staff 34, to which it is secured by a pair of spaced bolts 8 on which are tightened nuts 40. At its forward end, the shell 36 is provided with a ball-like head 42 which is connected to the body 44 of the shell 36 by a narrow neck 46 which gradually tapers outwardly as best seen in FIG. 3.

The neck 46 is sized slightly smaller diametrally than the width of the slot 26, and the head 42 and body 44 are sized substantially larger than the slot 26, whereby to establish a means of pivotally connecting the bracket 20 and the shell 36 while simultaneously permitting rotational movement of the shell 36 with respect to the bracket 20, all for purposes presently more fully to appear. The neck 46 is inserted in the slot 26 prior to the securing of the bracket 20 to the float member 10 in the manner best seen in FIG. 3.

Bolted or otherwise rigidly secured to the staff 34 and projecting downwardly therefrom is the control member 38 which comprises a straight portion 48 and an outwardly spiraling curved portion 50, all of round cross-section. Preferably though not necessarily the straight portion 48 is threaded for receiving bolts 52, 54, whereby to enable adjustable positioning of the curved portion 50 with respect to the axial center of the staff 34. The curved portion 52 projects downwardly through the loop portion 28 of the bracket 22.

In operation, the bull float A is operated by an individual workman who endeavors to keep the base 12 of the float member 10 in a horizontal position as the float member 10 is moved forward and backward over large areas of freshly poured concrete. It should be readily apparent that with large areas of concrete to be finished, the handle 32 must be variable in pitch or angle of inclination to enable the workman to handle the float A efficiently. In my invention, control of pitch is achieved merely by axial rotation of the staff 34. As the member 10 is moved away from the workman, clockwise rotation of the staff 34 urges the control member 38 clockwise through loop 28 causing the handle 32 to assume a more horizontal attitude. As the member 10 is moved toward the workman, counterclockwise rotation of the staff 34 urges the control member 38 counterclockwise through the loop 28 causing the handle 32 to assume a more vertical attitude. Thus by gradual rotation of the handle 32 in predetermined directions as the member 10 is moved alternately forwards and backwards, the workman may keep his hands generally in any desired position with respect to his body.

The rate at which the handle 32 changes pitch during rotation may be selectively varied by adjustment of the bolts 52, 54, causing the control member 38 to shift with respect to the handle 32.

It should be understood that changes and modifications in the form, construction, arrangement and combination of parts of the bull float may be made and substituted for those herein shown and described without departing from the nature and principle of my invention.

Having thus described my invention, what I desire and seek to secure by Letters Patent is recited in the following claims.

I claim:

1. A bull float comprising a float member, first and second brackets secured to said float member, a handle pivotally and rotationally secured to said first bracket, and an arcuate control member secured to said handle and movably secured to said second bracket, said control member being rotatable with the handle and contoured to coact with the second bracket for selectively urging said handle toward and away from said second bracket as said handle is rotated with respect to said first bracket.

2. A bull float comprising a float member, first and second brackets secured to said float member in spaced front to rear alignment, a handle pivotally and rotationally secured to said first bracket, and an arcuate control member secured to said handle and movably secured to said second bracket, said control member being rotatable with the handle and contoured to coact with the second bracket for selectively urging said handle toward and away from said second bracket as said handle is rotated with respect to said first bracket.

3. A bull float comprising a float member, first and second brackets secured to said float member in spaced front to rear alignment, a handle pivotally and rotationally secured to said first bracket, and a control member secured to said handle and being rotatable therewith, said control member also being movably secured to said second bracket, said control member being adapted for selectively urging said handle toward and away from said second bracket as said handle is rotated with respect to said first bracket and including a straight portion and an outwardly spiraling curved portion.

4. A bull float comprising a float member, first and second brackets secured to said float member in spaced front to rear alignment, a handle pivotally and rotationally secured to said first bracket, a control member secured to said handle and being rotatable therewith, said control member also being movably secured to said second bracket, said control member being provided with an outwardly spiraling curved portion adapted for coacting with said second bracket to urge said handle toward and away from said second bracket as the handle is rotated with respect to said first bracket, and means for selectively positioning the curved portion of the control member with respect to said handle.

5. A bull float comprising a float member, first and second brackets secured to said float member in spaced front to rear alignment, a handle pivotally and rotationally secured to said first bracket, and a control member permanently secured to said handle and movably secured to said second bracket, said control member including an outwardly spiraling bar-like element adapted to engage a loop-like element on the second bracket in interlocked but adjustable relation, said control member also including means for selectively adjusting the position of the handle and the spiraling element with respect to each other.

References Cited in the file of this patent
UNITED STATES PATENTS

| | | | |
|---|---|---|---|
| 129,205 | 7/72 | Bell. | |
| 1,021,557 | 3/12 | Runner | 15—235.8 |
| 1,590,342 | 6/26 | Abram | 15—235.8 |
| 1,713,513 | 5/29 | Abram | 15—235.8 |
| 3,090,066 | 5/63 | Ferrell et al. | 15—235.8 |

CHARLES A. WILLMUTH, *Primary Examiner.*